United States Patent [19]

Thoese

[11] Patent Number: 4,543,285
[45] Date of Patent: Sep. 24, 1985

[54] PLASTIC FILM

[75] Inventor: Klaus Thoese, Wiesbaden, Fed. Rep. of Germany

[73] Assignee: Hoechst Aktiengesellschaft, Frankfurt am Main, Fed. Rep. of Germany

[21] Appl. No.: 581,597

[22] Filed: Feb. 21, 1984

[30] Foreign Application Priority Data

Feb. 23, 1983 [DE] Fed. Rep. of Germany ....... 3306190

[51] Int. Cl.$^4$ ........................ B32B 27/08; B32B 27/34; B32B 27/36
[52] U.S. Cl. .................................... 428/201; 428/204; 428/207; 428/332; 428/413; 428/474.4; 428/480; 428/483
[58] Field of Search ...................... 428/474.4, 483, 201, 428/204, 207, 332, 413, 480, 483, 520, 479.6; 430/527; 427/393.5; 426/140

[56] References Cited

U.S. PATENT DOCUMENTS

| 3,720,539 | 3/1973 | Seibel et al. | 427/393.5 |
|---|---|---|---|
| 3,857,729 | 12/1974 | Burwasser | 430/527 |
| 4,066,820 | 1/1978 | Kelly et al. | 428/483 |
| 4,097,645 | 1/1978 | Toyoda et al. | 428/474.4 X |

FOREIGN PATENT DOCUMENTS

| 0031899 | 6/1984 | European Pat. Off. | 428/474.4 |
|---|---|---|---|
| 2949870 | 6/1981 | Fed. Rep. of Germany | 428/479.6 |
| 3207122 | 2/1982 | Fed. Rep. of Germany | 428/480 |
| 865727 | 4/1961 | United Kingdom | 428/479.6 |
| 1061784 | 3/1967 | United Kingdom | 428/480 |
| 1127076 | 9/1968 | United Kingdom | 428/480 |
| 1264338 | 2/1972 | United Kingdom | 428/480 |
| 1269381 | 4/1972 | United Kingdom | 428/413 |
| 1339317 | 12/1973 | United Kingdom | 430/527 |
| 1388954 | 4/1975 | United Kingdom | 428/413 |
| 1417419 | 12/1975 | United Kingdom | 426/140 |
| 1448889 | 9/1976 | United Kingdom | 428/520 |

OTHER PUBLICATIONS

H. Boardman, "Polyamide-Epichlorohydrin Resin with Antistatic Agent", p. 87.

*Primary Examiner*—Thomas J. Herbert
*Attorney, Agent, or Firm*—Schwartz, Jeffery, Schwaab, Mack, Blumenthal & Evans

[57] ABSTRACT

Disclosed is a plastic film which is provided on at least one surface with an antistatic coating. The coating is comprised of either a polyamino/polyamide resin modified with an epihalohydrin, in particular, epichlorohydrin, which acts as the antistatic agent, or of the antistatic agent together with a binder which is soluble in aqueous-alcohol solutions or is dispersible in water. The polyamino/polyamide resin preferably is a condensation product of an aliphatic saturated, dibasic carboxylic acid having at least three carbon atoms and a polyamine.

13 Claims, No Drawings

PLASTIC FILM

BACKGROUND OF THE INVENTION

The present invention relates to a plastic film having an antistatic coating on at least one surface thereof.

While plastic films are well known and exhibit good service value, the films have the disadvantage of an undesirably high electrostatic chargeability. Films are known in which either an antistatic agent is worked into the mixture of film-forming material, or a thin layer of antistatic agent is applied to the surface, in order to avoid this disadvantageous property. With the first-mentioned type, either the achieved effect is low or, if higher amounts of antistatic agent are added, the mechanical properties of the films are adversely affected. The application of an antistatic layer gives better results. The antistatic agents used are, in most cases, water-soluble, low molecular weight products or polymeric products. However, addition of the antistatic layer results in a film having only a limited resistance to moisture or water. Moreover, these layers can be easily abraded by mechanical means which render the film ineffective.

If conventional antistatic agents are used in combination with binders, the films are more resistant to mechanical strain; however their antistatic action is correspondingly reduced. Furthermore, the action of water diminishes the improved binder-promoted resistance.

SUMMARY OF THE INVENTION

It is therefore an object of the present invention to provide plastic films having an antistatic finish, which possess a high resistance to the attack of moisture and water.

It is also an object of the present invention to provide plastic films with an antistatic finish, the properties of which are not impaired, or at least not considerably impaired, by mechanical action.

In accomplishing the foregoing objects, there has been provided in accordance with the present invention, a plastic film comprising a plastic support, an antistatic coating applied on at least one surface of the support, the antistatic coating comprising a polyamino/polyamide resin modified with epihalohydrin. Preferably, the resin comprises the condensation product of an alkylene diamine or a polyalkylene polyamine and either a dibasic carboxylic acid with from about 3 to 10 carbon atoms, or a polymeric carboxylic acid with at least 18 carbon atoms, in which case the basic component of the polyalkylene polyamine is contained in a stoichiometric excess over the carboxyl groups which are present.

Also provided is an antistatic coating comprised of the antistatic agent and a binder which is soluble in an aqueous-alcohol solution or is dispersable in water.

Further objects, features and advantages of the present invention will become apparent from the detailed description of preferred embodiments which follows.

DETAILED DESCRIPTION OF PREFERRED EMBODIMENTS

The present invention provides a plastic film which is characterized by a coating comprising an antistatic agent. The antistatic agent comprises a polyamino/polyamide resin modified with epihalohydrin, preferably epichlorohydrin.

The present invention achieves the advantageous result that plastic films, having an antistatic finish are provided. Such films can be used, for example, as cassette slip sheets, mounting films, or as leader tapes for video tapes in which the antistatic action is not impaired by moisture, water, or mechanical strain.

The polyamino/polyamide resins modified with an epihalohydrin which are used in accordance with this invention are known. They are used as sizing agents for paper, whereby they increase the wet resistance of paper, as is described in German Auslegeschrift No. 19 06 450 (equivalent to British Pat. No. 1,269,381), German Auslegeschrift No. 11 77 824 (equivalent to British Pat. No. 865,727), German Offenlegungsschrift No. 29 49 870 (equivalent to European Patent Application No. 0,031,899 and German Auslegeschrift No. 17 71 243 (equivalent to British Pat. No. 1,388,954). In general, these are products which no longer contain free epihalohydrin. It is also known to employ these resins in the production of coated sausage casings, as anchoring agents by which the permeability to water vapor and oxygen is reduced (German Auslegeschrift No. 21 62 204, equivalent to British Pat. No. 1,417,419). In another application, the resins function as components of adhesion promoters for photographic films (German Auslegeschrift No. 21 39 538, corresponding to British Pat. No. 1,339,317). Accordingly, these polyamide resins contain amino groups which when modified with epihalohydrin are suitable for use as strengthening and bonding agents, thereby taking advantage of their crosslinkability.

However, the use of these compounds in the present invention as effective antistatic agents, was completely surprising.

The commercially available polyamino/polyamide resins modified with epihalohydrins are obtained by condensing, for example, epichlorohydrin with an amino group-containing polyamide. Polyamines which can be used include normal alkylene diamines or polyalkylene polyamines, such as diethylene triamine, triethylene tetramine, tetraethylene pentamine and the corresponding polypropylene polyamines. The polyamino/polyamides are condensation products of a saturated, aliphatic, dibasic carboxylic acid containing at least three carbon atoms and one of the above polyamines. Preference is given to condensation products of a dibasic carboxylic acid having three to ten carbon atoms as the dibasic acid or of a polymeric carboxylic acid which contains at least 18 carbon atoms, and a polyalkylene polyamine wherein the base component can be present in a stoichiometrical excess over the carboxyl groups. It is also possible to use mixtures of the acids and polyamines, if the polyamino/polyamide resin product is soluble or at least dispersible in water.

Polyamino/polyamide resins which have been prepared from polymeric carboxylic acids which contain at least 18 carbon atoms, and in which the base component is present in a stoichiometrical excess over the carboxyl groups are also well suitable. These carboxylic acid amide amines are prepared by heating the carboxylic acids with polyalkylene polyamines. The polymeric carboxylic acids are, for example, obtained by the dimerization of unsaturated fatty acids present in industrial oils. Possible polyalkylene polyamines are ethylene diamine, diethylene triamine, propylene diamine, dipropylene triamine and the higher-molecular homologues thereof, such as, for example, hexamethylene diamine, and also the mixtures thereof.

In accordance with one embodiment of the present invention, the antistatic coating comprises epichlorohydrin-modified polyamino/polyamide resins alone, since they are capable of forming films. However, in a more preferable embodiment, the antistatic coating is comprised of the antistatic agent, and a binder which is soluble in an aqueous-alcoholic solution or dispersible in water.

The coating has a thickness corresponding to a layer weight of from about 0.01 to 3 g/m². The layer preferably contains from about 30 to 70% by weight, relative to its total weight, of polyamine/polyamide resin modified with epihalohydrin; in particular epichlorohydrin.

Suitable binders are, for example, homo- and copolymers of vinyl acetate, acrylic or methacrylic acid esters, styrene, vinyl chloride, vinylidene chloride, alcohol-soluble cellulose esters, other polymers and formaldehyde precondensates, which can be applied in the form of aqueous dispersions or aqueous-alcoholic solutions.

The appropriate binder is selected in accordance with the respective envisaged use. For example, cellulose esters, polyvinyl acetates, polyacrylates or polymethacrylates, which are only soluble in mixtures of alcohol and little water will be used for antistatic layers possessing particular mechanical strength. If no explosion-proof apparatus is availale, polymers which are dispersible in water are recommended as binders.

Plastic films of polyvinyl chloride, polycarbonate, polystyrene, polysulfone, polyolefin, polyester or cellulose ester, such as acetate films, are used as supports. Because of their excellent dimensional stability, which in many cases is of particular importance, films based on polyester, such as, for example, polyethylene terephthalate, are preferably employed.

The antistatic coating of this invention can be applied to either one or both surfaces of the support. In the case of a single-sided coating, the other surface can also carry another functional layer, for example, a pigmented or dyed layer.

Furthermore, at least one surface of the plastic support can be provided with an adhesion-promoting intermediate layer, which is then coated with the layer of the antistatic agent of this invention.

Intermediate layers of this type are composed of known mixtures, such as the mixtures described, for example, in German Pat. No. 12 28 414 (equivalent to British Pat. No. 1,061,784), which comprise a mixture of an aqueous solution of a halocarboxylic acid, finely divided silicon dioxide and wetting agent; or of mixtures of the type described in German Auslegeschrift No. 16 94 534 (equivalent to British Pat. No. 1,209,992). Substrated films in accordance with German Auslegeschrift No. 16 29 480 (equivalent to British Pat. No. 1,127,076) and German Auslegeschrift No. 20 34 407 (equivalent to British Pat. No. 1,264,338) can also be used.

The invention will now be explained in greater detail by way of the non-limiting examples which follow.

Table 1 below lists the resins which were used as the antistatic agents. The products designated with the short name A, B and D are polyamino/polyamide resins of $C_3$ to $C_{10}$ dicarboxylic acids, which are modified with epichlorohydrin and dissolved in water. Product C is a polyamino/polyamide resin of carboxylic acids having chain lengths of more than 10 carbon atoms, which is modified with epichlorohydrin and dissolved in water.

TABLE 1

| Short name | A | B | C | D |
|---|---|---|---|---|
| Concentration (%) | 20 | 10 | 14 | 12.5 |
| Viscosity at 20° C. (mPa · s) | 35–70 | 10–14 | 5–15 | about 15 |
| pH | 2.5–3 | 4–4.5 | about 4.5 | 5 |
| spec. gravity (g/cm³) (+) | 1.056 to 1.062 | 1.022 to 1.024 | 1.02 | 1.034 |

(+) The specific gravities were determined at 20° C., at 25° C. in the case of D.

EXAMPLE 1

The plastic film used was a 125 μm thick film of biaxially oriented polyethylene terephthalate which was provided with an adhesive layer as known from German Auslegeschrift No. 20 34 407.

This support was coated with the following solutions by means of a doctor blade, in a way such that after a drying period of 5 minutes at 120° C., dry weights of 0.2 to 0.3 g/m² were obtained. The solids concentration of the solutions was 2.5%.

I
  25 g of resin (A)
  75 g of deionized water
  100 g of isopropyl alcohol
  2 g of wetting agent solution+) (10% strength)

II
  50 g of resin (B)
  50 g of deionized water
  100 g of isopropyl alcohol
  2 g of wetting agent solution+) (10% strength)

III
  50 g of resin (C)
  90 g of deionized water
  140 g of isopropyl alcohol
  5.6 g of wetting agent solution+) (10% strength)

+) The wetting agent used in all cases was a tributylphenol polyglycol ether which contained about 13 moles of ethylene oxide in the polyglycol chain.

The films were examined by a visual inspection of their clearness. The mechanical strength was tested by rubbing. The antistatic effect of the films was characterized by measuring the surface resistances in accordance with DIN No. 53 482, electrode arrangement A or VDE 0303, part 3 (similar to IEC 167), using a measuring voltage of 100 V. Characterization was performed after the samples had been conditioned for 24 hours at 50% relative humidity and a temperature of 23° C.

The surface resistance of the films was determined using the samples which had just been prepared, and samples which had been immersed in deionized water for 10 minutes and dried in the air.

The results are compiled in Table 2

| Solution | Visual Impression | Mechanical Strength | Surface resistance (Ω) dry | after immersion in water |
|---|---|---|---|---|
| I. | almost clear | low | $2.8 \times 10^{10}$ | $6.5 \times 10^{12}$ |
| II. | slightly hazy | very low | $1.8 \times 10^{10}$ | $2.6 \times 10^{12}$ |
| III. | clear | very low | $1.6 \times 10^{11}$ | $6.5 \times 10^{11}$ |

EXAMPLE 2

The plastic film used was a 75 micron thick film of biaxially oriented polyethylene terephthalate having an adhesive layer on both sides thereof in accordance with German Auslegeschrift No. 20 34 407. These films were coated with 2.5% strength solutions of equal parts of deionized water and isopropanol, as described in Example 1, and the coatings were dried. The epichlorohydrin-modified polyamino/polyamide resins were mixed with an ammonium salt of a copolymer of vinyl acetate and 5% crotonic acid, the weight ratios of the mixtures being indicated in Table 3 below:

TABLE 3

| Composition (%) | | Visual impression | Surface resistance ($\Omega$) | |
|---|---|---|---|---|
| Copolymer | Resin | | dry | after immersion in water |
| 100 | 0 | clear | $<10^{13}$ | $<10^{13}$ |
| 0 | 100 A | clear | $1.5 \times 10^{10}$ | $4.2 \times 10^{12}$ |
| 20 | 80 A | hazy | $6.0 \times 10^{11}$ | $2.1 \times 10^{13}$ |
| 30 | 70 A | hazy | $6.5 \times 10^{11}$ | $5.6 \times 10^{12}$ |
| 50 | 50 A | almost clear | $1.1 \times 10^{12}$ | $2.4 \times 10^{13}$ |
| 0 | 100 B | very hazy | — | — |
| 20 | 80 B | hazy | $1.9 \times 10^{10}$ | $1.8 \times 10^{12}$ |
| 30 | 70 B | hazy | $3.7 \times 10^{10}$ | $1.5 \times 10^{12}$ |
| 50 | 50 B | clear | $5.5 \times 10^{10}$ | $<10^{13}$ |
| 0 | 100 C | clear | $1.3 \times 10^{10}$ | $5.5 \times 10^{11}$ |
| 20 | 80 C | clear | $3.4 \times 10^{10}$ | $1.5 \times 10^{12}$ |
| 30 | 70 C | clear | $2.8 \times 10^{10}$ | $6.5 \times 10^{11}$ |
| 50 | 50 C | clear | $4.6 \times 10^{10}$ | $9.1 \times 10^{12}$ |

EXAMPLE 3

As described in Example 2, layers were prepared of resin C and other polymers, with a solids ratio of 1:1. For this purpose, films were prepared from 2.5% strength solutions of different polymers in a solvent mixture comprised of 10% deionized water and 90% isopropyl alcohol. Furthermore, equal parts by weight of the following solution were added to the solutions and films were formed. The lower values, which are indicated in each case in Table 4 below, apply to the results achieved using this solution.

50 g of resin C
90 g of deionized water
140 g of isopropyl alcohol

TABLE 4

| Type of polymer | Visual impression | Mechanical strength after 1 h in water | Surface resistance ($\Omega$) |
|---|---|---|---|
| alcohol-soluble cellulose acetopropionate | clear slightly hazy | good slightly reduced | $<10^{13}$ $1.3 \times 10^{11}$ |
| methyl methacrylate copolymer | clear slightly hazy | good good | $6.0 \times 10^{13}$ $9.5 \times 10^{10}$ |
| vinyl acetate/crotonic acid copolymer | clear almost clear | good good | $2.5 \times 10^{13}$ $1.3 \times 10^{11}$ |
| polyvinyl acetate | clear almost clear | good good | $2.3 \times 10^{13}$ $9.0 \times 10^{10}$ |

EXAMPLE 4

The film described in Example 1 was used as the plastic support. The polymers employed were products, in the form of aqueous dispersions, of the following:

(1) Acrylic ester copolymer dispersion having a solids content of 40%, a pH of 5 to 7 and a mean particle size of 0.23 $\mu$m.
(2) Polyvinyl acetate dispersion having a solids content of about 53%, being free from plasticizer, and having a pH of 4 to 5 and particle sizes of 0.1 to 1 $\mu$m.
(3) Styrene homopolymer dispersion having a solids content of about 50%, being free from plasticizer, and having a pH of 7.5 to 9.5.

20% strength dispersions in water were applied and converted into films. Additionally, the dispersions were mixed as described below with the resin B mentioned above and further processed in accordance with Example 1.

COMPOSITIONS

I
35 g of dispersion 1
5 g of tap water
60 g of resin B

II
26 g of dispersion 2
14 g of tap water
60 g of resin B

III
28 g of dispersion 3
12 g of tap water
60 g of resin B

Table 5 below lists the results obtained using films comprised of the dispersions alone which are listed first, followed by the results achieved using the mixtures I to III.

TABLE 5

| Dispersion or mixture | Visual impression | Surface resistance ($\Omega$) | |
|---|---|---|---|
| | | dry | after immersion in water |
| 1 | clear | $<10^{13}$ | $9.5 \times 10^{13}$ |
| I. | slightly hazy | $9 \times 10^{9}$ | $8.5 \times 10^{10}$ |
| 2 | clear | $1.2 \times 10^{12}$ | $<10^{13}$ |
| II. | clear | $3.8 \times 10^{9}$ | $3.4 \times 10^{10}$ |
| 3 | clear | $2.6 \times 10^{11}$ | $<10^{13}$ |
| III. | slightly hazy | $3.8 \times 10^{9}$ | $4.2 \times 10^{10}$ |

EXAMPLE 5

The same process as in Example 4 was followed. The following mixtures were used.

I
26 g of dispersion 2
14 g of tap water
60 g of resin B

II
26 g of dispersion 2
44 g of tap water
30 g of resin A

III
26 g of dispersion 2
26 g of tap water
48 g of resin D

IV 26 g of dispersion 2
31 g of tap water
43 g of resin C

TABLE 6

| Mixture No. | Visual impression | Surface resistance ($\Omega$) | |
|---|---|---|---|
| | | dry | after immersion in water |
| I. | clear | $3.8 \times 10^9$ | $3.4 \times 10^{10}$ |
| II. | clear | $9.0 \times 10^{10}$ | $1.5 \times 10^{12}$ |
| III. | clear | $2.1 \times 10^{11}$ | $2.4 \times 10^{12}$ |
| IV. | clear | $1.2 \times 10^{10}$ | $4.6 \times 10^{11}$ |

EXAMPLE 6

The solutions described in Example 3 were prepared using vinyl acetate/crotonic acid copolymer or polyvinyl acetate as the binder, in combination with resin C in accordance with Example 3. The solution was then dried for 5 minutes at 100° C.

The plastic support used was a 75 μm thick film of biaxially oriented polyethylene terphthalate, which did not contain an adhesion-promoting layer. In Table 7 below, the test results are compiled, the second value always indicating the results achieved with layers containing the resin C.

TABLE 7

| Type of polymer | Visual impression | Water resistance | surface resistance ($\Omega$) | |
|---|---|---|---|---|
| | | | dry | after immersion in water |
| Copolymer of vinyl acetate and crotonic acid | clear clear | good substantially good | $<10^{13}$ $2.8 \times 10^{11}$ | $<10^{13}$ $<10^{13}$ |
| polyvinyl acetate | clear clear | good substantially good | $<10^{13}$ $2.2 \times 10^{11}$ | $<10^{13}$ $<10^{13}$ |

EXAMPLE 7

The process of Example 6 was followed, with the exception that a 140 μm thick crystal clear cellulose triacetate film was used as the plastic support. The test results are compiled in Table 8 below. Here, too, the second value applies to the coating which contains the resin C.

TABLE 8

| Type of polymer | Visual impression | Water resistance | surface resistance ($\Omega$) | |
|---|---|---|---|---|
| | | | dry | after immersion in water |
| Copolymer of vinyl acetate and crotonic acid | clear clear | good substantially good | $<10^{13}$ $6.5 \times 10^{10}$ | $<10^{13}$ $1.7 \times 10^{13}$ |
| polyvinyl acetate | clear clear | good substantially good | $3.8 \times 10^{12}$ $3.5 \times 10^{11}$ | $2.2 \times 10^{13}$ $6.1 \times 10^{12}$ |

EXAMPLE 8

The diluted solution of the polymer dispersion 2 of Example 4 was applied to a 140 μm thick film of cellulose triacetate. Furthermore, the mixture obtained by adding the resin B to the mixture II of Example 4 was applied to the film. The lacquers were dried for 5 minutes at 100° C. The test results are compiled in Table 9, below.

TABLE 9

| Dispersion or mixture | Visual impression | Water resistance | surface resistance ($\Omega$) | |
|---|---|---|---|---|
| | | | dry | after immersion in water |
| 2 | clear | substantially good | $5.0 \times 10^{11}$ | $5.2 \times 10^{12}$ |
| II | clear | moderate | $3.6 \times 10^9$ | $4.8 \times 10^{11}$ |

What is claimed is:

1. A plastic film, comprising:
a plastic support; and
an antistatic coating applied on at least one surface of said support, said antistatic coating comprising a polyamino/polyamide resin modified with epihalohydrin.

2. A plastic film as claimed in claim 1, further comprising a pigmented layer on the surface of said support opposite said antistatic coating.

3. A plastic film as claimed in claim 1, further comprising a dyed layer on the surface of said support opposite said antistatic coating.

4. A plastic film as claimed in claim 1, wherein said antistatic coating comprises a binder which is soluble in an aqueous-alcohol solution or dispersible in water.

5. A plastic film as claimed in claim 1, wherein said coating has a thickness corresponding to a layer weight of from about 0.01 to 3 g/m².

6. A plastic film as claimed in claim 1, wherein said coating comprises from about 30 to 70% by weight, relative to the total weight, of polyamine/polyamide resin modified with epihalohydrin.

7. A plastic film as claimed in claim 1, wherein said epichlorohydrin-modified polyamino/polyamide resin comprises a condensation product of a polyamine and an aliphatic, saturated, dibasic carboxylic acid having at least 3 carbon atoms.

8. A plastic film as claimed in claim 7, wherein said condensation product comprises a dibasic carboxylic acid having from about 3 to 10 carbon atoms and a polyalkylene polyamine.

9. A plastic film as claimed in claim 7, wherein said condensation product comprises a polymeric carboxylic acid having at least 18 carbon atoms, wherein said polyalkylene polyamine comprises a stoichiometric excess of the basic component over the carboxyl groups.

10. A plastic film as claimed in claim 7, wherein said condensation product comprises a mixture of dibasic carboxylic acids and polyamines and is dispersible in water.

11. A plastic film as claimed in claim 1, further comprising an adhesive layer applied on at least one surface of said support.

12. A plastic film as claimed in claim 11, wherein said antistatic coating is applied on said adhesive layer.

13. A plastic film, comprising:
a plastic support comprising polyester film;
an adhesive layer applied on at least one surface of said support; and
an antistatic coating applied on each adhesive layer, said antistatic coating comprising a polyamino/polyamide resin modifed with epihalohydrin.

* * * * *